United States Patent [19]

Hess et al.

[11] Patent Number: 4,996,687
[45] Date of Patent: Feb. 26, 1991

[54] FAULT RECOVERY MECHANISM, TRANSPARENT TO DIGITAL SYSTEM FUNCTION

[75] Inventors: Richard F. Hess, Glendale; Kurt A. Liebel; Larry J. Yount, both of Phoenix, all of Ariz.

[73] Assignee: Honeywell Inc., Minneapolis, Minn.

[21] Appl. No.: 256,060

[22] Filed: Oct. 11, 1988

[51] Int. Cl.⁵ .................... G06F 11/14; G06F 11/16
[52] U.S. Cl. .................... 371/10.1; 364/200; 364/266.5; 364/268.5; 364/900; 364/945; 364/945.3; 371/13
[58] Field of Search .................... 371/7, 9.1, 10.1, 11.1, 371/11.3, 12, 13; 364/245.2, 268.5, 945.3, 970, 970.1, 970.4, 945, 266.5; 365/228

[56] References Cited

U.S. PATENT DOCUMENTS

| | | | |
|---|---|---|---|
| 3,736,566 | 5/1973 | Anderson et al. | 371/12 X |
| 4,199,810 | 4/1980 | Gunckel, II et al. | 364/200 |
| 4,413,327 | 11/1983 | Sabo et al. | 364/900 |
| 4,442,501 | 4/1984 | Eckert, Jr. et al. | 364/900 |

OTHER PUBLICATIONS

Bernstein, P., "Seguoia: A Fault-Tolerant Tightly Coupled Multiprocessor for Transaction Processing", Computer, Feb. 1988, pp. 37–45.

Primary Examiner—Jerry Smith
Assistant Examiner—Stephen M. Baker
Attorney, Agent, or Firm—Haugen & Nikolai

[57] ABSTRACT

A method and apparatus allows fault recovery in a digital computer based control system whereby system upsets induced by external transient noise conditions can be accommodated. A CPU is coupled to its main memory and its I/O interfaces by a common address-/data bus, these three elements being susceptible to having data thereon or therein corrupted by transient noise. Also coupled to the bus, but in a hardened environment, are first and second supplemental memories which, under memory control, operate on alternating even and odd computational frames defined by the CPU's real-time clock to store the same words as are then being entered into the CPU's main memory. As computational frames are entered into one or the other of these two memories by eaves-dropping on the common bus, the other supplemental memory is transferring its contents to a backup memory which is also housed in the noise-immune environment. The backup memory is connected in a read-only mode to the address/data bus and, because of the manner of operation, always contains the computational frame that is delayed one cycle of the CPU's real-time clock from the frame in progress. Should a transient upset occur, it may be followed by a transfer of the information from the backup memory into the computer's main memory such that computations can then continue with data that is uncorrupted.

7 Claims, 9 Drawing Sheets

FAULT RECOVERY MECHANISM, TRANSPARENT TO DIGITAL SYSTEM FUNCTION

BACKGROUND OF THE INVENTION

I. Field of the Invention

This invention relates generally to a method and apparatus for increasing the reliability of digital computing systems, and more particularly to an improved error recovery technique in complex digital computer based control systems.

II. Discussion of the Prior Art

As the reliability and performance of digital computers have steadily improved, they have become the predominant technology for control systems. For example, in avionics systems, digital computers are now considered for such concepts as fly-by-wire or autoland in which a digital computer is interposed between the pilot and the aircraft control surfaces. In such systems, the safety of the aircraft depends on continued faultless performance of the digital control system.

To achieve the requisite reliability in such applications, prior art systems have typically resorted to hardware redundancy with majority voting. Typically, a minimum of three identical processing elements are configured to perform identical control computations on identical data inputs. In the event a disparity occurs between the multiple processing elements, the minority result(s) is ignored and one of the majority results is used to effect the control function. A majority-of-three voting allows the system to tolerate a single failure while majority-of-five allows the system to tolerate up to two failures. In more elaborate systems, a persistently failing unit may be voted out of the system and replaced with a so-called "hot spare".

Various forms of redundancy synchronization, voting and fault monitoring have been proposed or employed in the past. However, while it is recognized that these mechanisms influence the type of recovery technique a particular system may employ, this invention addresses only a manner of recovery and not these other mechanisms.

A fault condition may be induced by a permanent failure of the digital circuitry, in which case it is considered a "hard fault". Alternatively, it may be induced by a transient phenomena which results in an incorrect result, but does not, in fact, damage or alter the subsequent operation of the circuitry. This condition is classified as a "soft fault" or "soft error". Soft errors may be induced by various transient conditions, such as electromagnetic interference (EMI), inherent noise, lightning, electromagnetic pulses (EMP), or high energy radio frequency (HERF). In this specification, the term "external transient noise condition" is intended to include all of the above sources.

As newer digital technology is introduced, the trend seems to be that the amount of energy necessary to change the state of a memory element or a logic element is reduced, thereby making these elements more susceptible to upset due to EMI, lightning, EMP, or HERF. With careful design, the susceptibility of the control system circuitry to such transient conditions can be greatly reduced. However, it is generally not practical to harden the entire control system to the extremes of any and all interference which may be encountered in an avionics application. It is, therefore, important that safety-critical digital control systems be able to tolerate transient upsets without affecting the performance of the critical application.

Recognizing that transient upsets will occur in certain applications, it is highly desirable to provide an error recovery mechanism whereby a processing element can be restored to a functional condition following a soft error. With an error recovery mechanism, the hardware redundancy can be reserved to cover only the hard error conditions, thereby increasing the overall system reliability. The error recovery mechanism further provides a clear diagnostic distinction between soft and hard errors and, therefore, practically eliminates the incidences of unconfirmed removal whereby a functionally good processing element is falsely suspected of being faulty due to upsets.

One well-known method of effecting soft error recovery is to design the control algorithm around a computational frame where the time interval of the computational frame generally corresponds to the sampling interval of the control system. When a soft error is detected, the computer is reset to a known state corresponding to the beginning of the current computational frame and the control algorithm is restarted. Soft error recovery in a majority-voting redundant system imposes yet another constraint. The faulty computing element must not only be rolled back to the beginning of the computational frame, but must also be restarted in synchrony with the other computing elements. While it is recognized that the relationships between the redundancy elements within a system impact the operation of the system, this invention defines a method of fault recovery and does not address redundancy management concerns.

Prior art redundant digital systems have provided recovery from transient disturbances to the digital circuitry with a "transfusion" of data. Following the detection of a digital circuit upset, "transfused" data is transmitted from the unaffected redundant digital circuits to the upset digital circuits in order to restore the upset circuitry to the identical state as the unaffected circuits. For example, in a system comprised of three digital processing lanes, if one lane is determined to be faulty by the voting logic, it is isolated. The remaining two lanes then transmit the current state variables necessary to complete the recovery. The isolated lane then resumes processing in synchrony with the active lanes and is readmitted to the system after performing a given number of computation frames without another detected fault. It is possible that a single transient disturbance might cause an upset in each of the redundant processing elements. In this instance, the redundancy is defeated and the system crashes, since there is no source of valid data available for transfusion.

A further limitation of prior art approaches is that the software required to perform the data transfusion, in the event of a fault, is specific to both the application being performed and the level of redundancy and the redundant architecture employed in the system.

It is highly desirable, and in some instances imperative, that fault-tolerant techniques such as soft-error recovery be totally transparent to the software and independent of the context of the control application.

OBJECTS OF THE INVENTION

It is an object of the invention to provide a soft error recovery mechanism by which a single processing element can be restored to a functional state without interaction between any other redundant processing elements.

It is another object of the invention to provide a soft error recovery mechanism which is transparent to the operational software.

It is a further object of the invention to provide a soft error recovery mechanism which is applicable to a wide range of fault tolerate architectures.

It is yet a further object of the invention to provide a soft fault error recovery mechanism which will enable a redundant digital system to operate without error, even in the event of a transient disturbance which causes simultaneous upsets in each of the redundant processing elements.

SUMMARY OF THE INVENTION

The foregoing objects and advantages are achieved by providing a real-time control system having a central processing unit (CPU) having an address/data bus coupling it to a main random access memory and I/O devices also coupled to the bus. Also associated with the bus is soft error recovery circuitry which is effectively shielded and protected from upset due to external transient noise sources. This latter soft error recovery circuitry includes a first, "even" supplemental RAM, a second, "odd" supplemental RAM, a backup RAM and the memory control circuits for operating same.

During each computational frame in which data words are written into the main RAM, they are simultaneously copied from the address/data bus into either the first or the second supplemental RAM on an alternating basis. Because of the manner in which the memory control toggles the first and second supplemental RAMs back and forth, one is made to contain memory elements which have been updated in the current computational frame while the other contains memory elements which were updated in the immediately preceding computational frame. While main memory entries are being entered into one or the other of the first and second supplemental RAMs, the contents of the other supplemental RAM, which were updated in the previous frame, are transferred into the backup RAM. Should an external transient disturbance or upset occur which might impact the address/data bus, the CPU or the main RAM, recovery is achieved by transferring the contents of the backup RAM into the main RAM so as to effectively place the system in the same operating mode as it existed at the beginning of the computational frame in which the transient upset occurred.

DESCRIPTION OF THE DRAWINGS

The foregoing objects, advantages as well as the principles of operation of the present invention will become apparent to those skilled in the art from the following detailed description of the preferred embodiment, especially when considered in conjunction with the accompanying drawings in which.

DESCRIPTION OF THE PREFERRED EMBODIMENT

Figure 1:
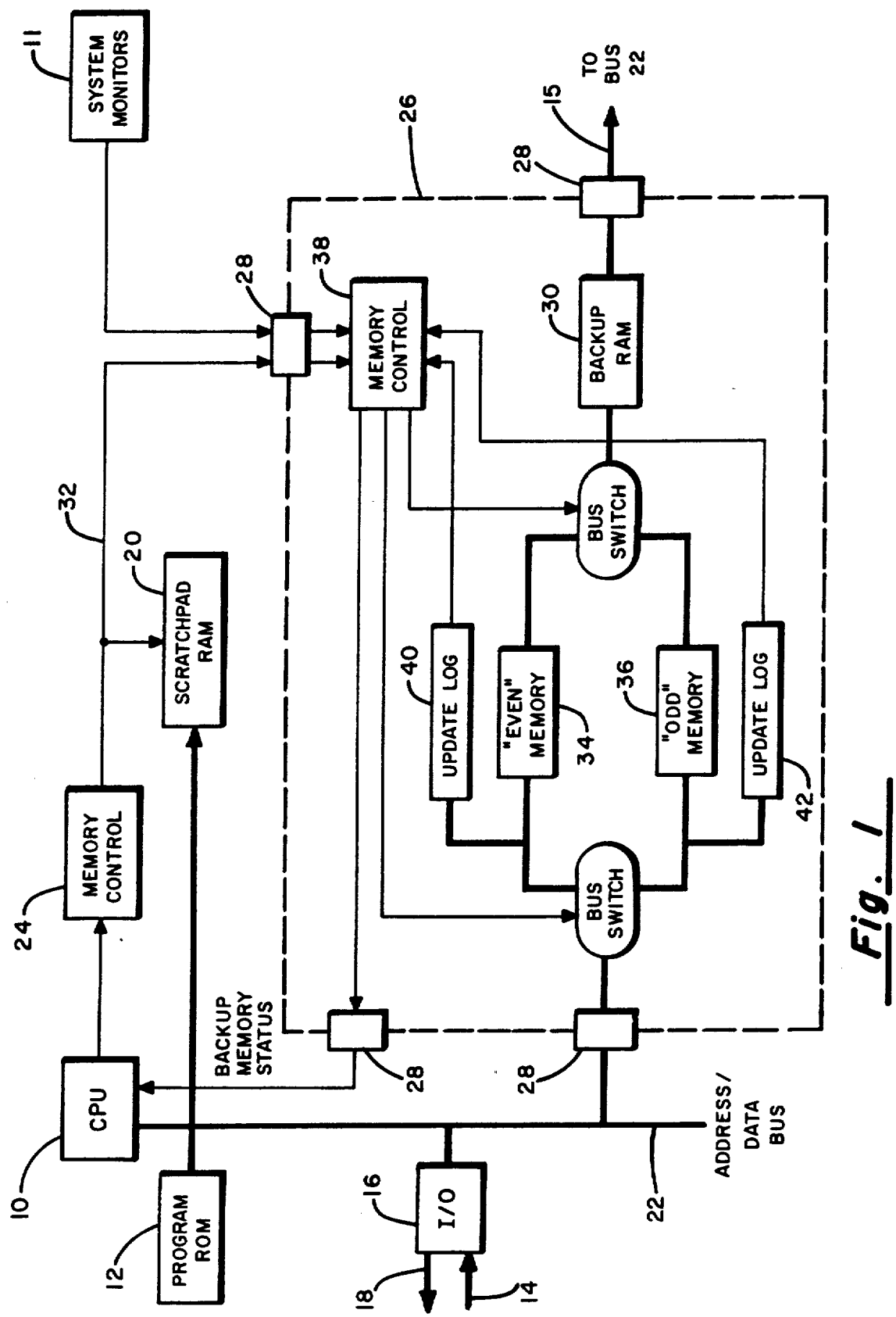
FIG. 1 is a general block diagram of the fault recovery mechanism in accordance with the present invention.

FIG. 1 shows a block diagram of a processing element employing the novel soft error recovery mechanism. This processing element could be used as a unit processor or as one of a number of processing elements in a redundant system. Central processing unit (CPU) 10 executes a stored program contained in program read-only memory (ROM) 12 to perform the real-time control algorithm. Inputs from sensors in the control system (not shown) are sampled on input lines 14, via I/O circuitry 16, and control actions for the system are effected, via outputs 18 and I/O circuitry 16. Operand storage is provided by scratchpad random access memory (RAM) 20 which may be considered as the CPU's main memory. Data is transferred between the CPU, ROM, RAM and I/O via address/data bus 22. Control signals required to execute a read or a write cycle on the main RAM memory 20 are provided by memory control circuit 24.

The circuitry described thus far comprises a conventional digital processing system, including such systems used, say, for avionics control applications. To this conventional arrangement is added the soft error recovery circuitry shown enclosed by broken line box 26. This circuitry should be hardened to possible noise sources, such as EMI, lightning, EMP and HERF, to assure that in the worst case, no transient disturbance will cause an upset in any part of that circuit. Where as it would generally be impractical to harden the entire control system to this level, it is practical to harden the relatively small amount of circuitry implementing the soft error recovery hardware 26 in that the volume and power required for this circuitry is a relatively small fraction of the total volume and power required for the processing element. EMI hardening techniques are well understood in the art and would include, at a minimum, extensive shielding and conditioning of all input and output lines, e.g., by the use of opto-isolators 28 or the like to eliminate conducted interference.

The soft error recovery approach of this invention requires that all variables which define the state of the digital function be stored in scratchpad RAM 20. Each of these variables must be written into scratchpad RAM 20 during the same computational frame that is updated. Soft error recovery is, thus, the restoration of the contents of scratchpad RAM 20 to the state that existed at the beginning of the computational frame in which a fault or upset is detected. Soft error recovery circuitry 26 restores scratchpad RAM 20 in the event of a fault by copying the contents of a backup RAM 30 to scratchpad RAM 20. Backup RAM 30 operates so as to maintain a valid copy of scratchpad RAM 20, but delayed one frame, for later rollback to the beginning of the present computational frame. It is maintained in this state by eaves-dropping by the supplemental RAMs on address/data bus 22 and control lines 32 to capture the address and the data of each write into RAM 20 during a given computational frame. Data transfers from the address/data bus 22 to a first supplemental memory referred to as "even memory" 34 and a second supplemental memory referred to as "odd memory" 36 and backup RAM 30 are managed by the memory control circuitry 38 to assure that backup RAM 30 is continuously updated in a manner that assures that it is always ready for a rollback.

Figure 2:
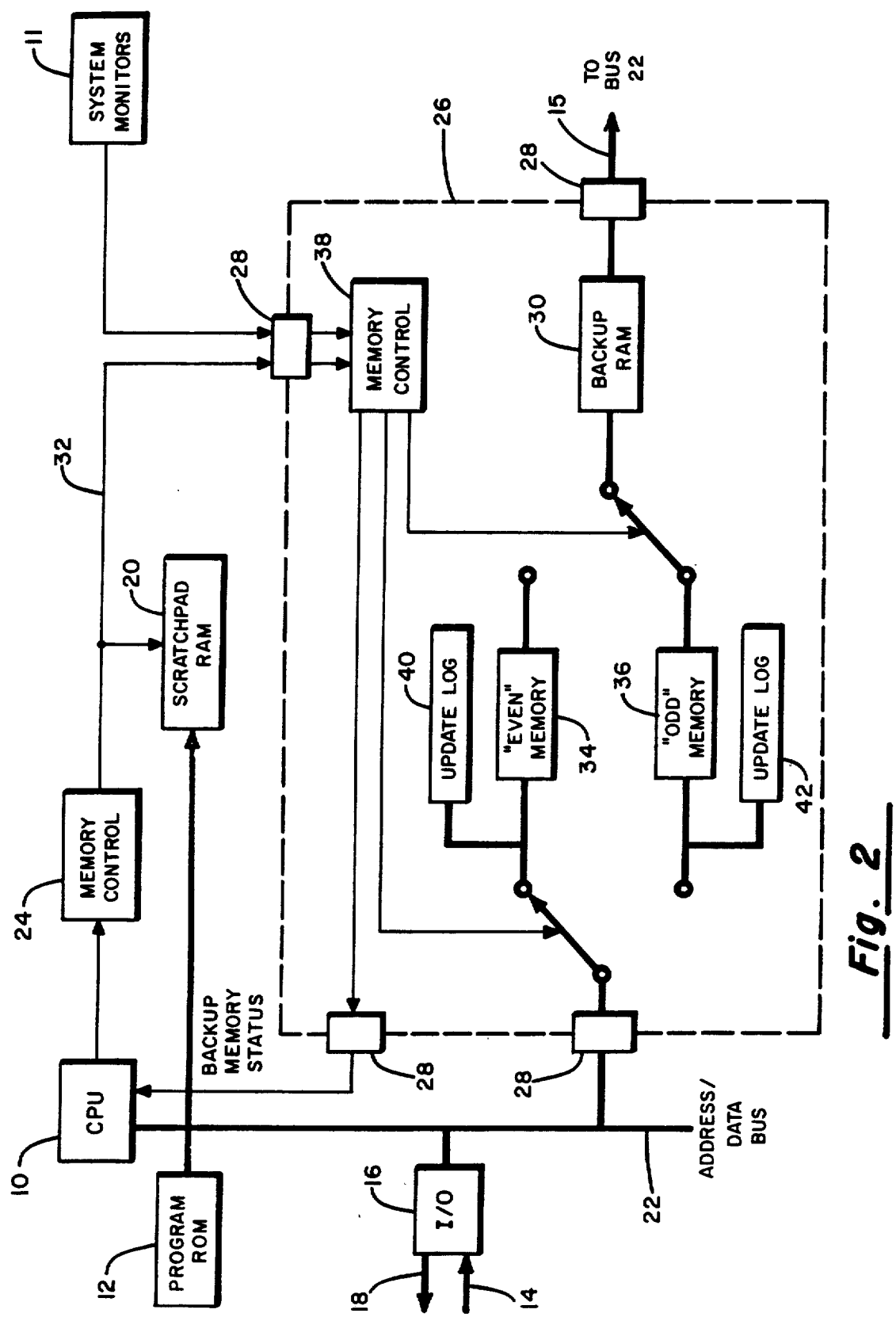
FIG. 2 is a general block diagram showing the interconnections of the error recovery circuit during even computational frames.
Figure 3:
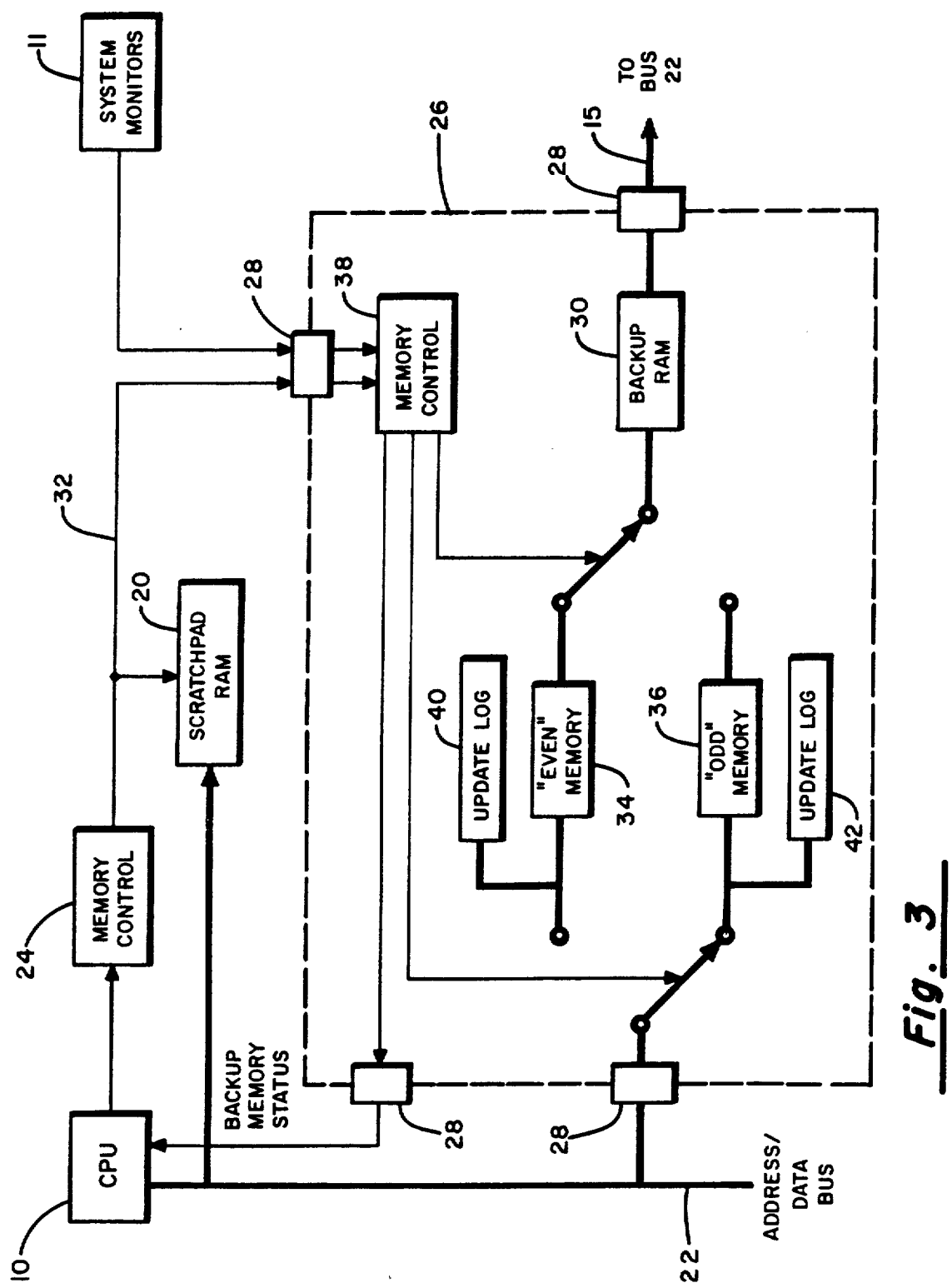
FIG. 3 is a general block diagram showing the interconnections of the error recovery circuit during odd computational frames.

To better understand the data recording techniques carried out in the implementation of the present invention, reference is made to FIGS. 2 and 3 which respectively show the manner in which the even and odd RAM memories 34 and 36 become coupled to the address/data bus 22 at successive times established by the CPU's real-time clock. With reference to FIG. 2, it can be seen that during even computational frames, any writes which occur to the main memory (scratchpad RAM 20) are simultaneously entered into the even supplemental RAM 34. An update log 40 is associated with the even RAM 34 and comprises an n-word memory one bit wide. It is therefore capable of storing a flag or update bit in a bit position (address) corresponding to those words which are altered in the main memory 20 by a write operation during the even computational frames.

In a similar fashion, as illustrated in FIG. 3, during odd computational frames, the odd supplemental memory 36 is written into in parallel with entries made in the main RAM 20, with the write occurrence being recorded in an odd update log 42.

With continued reference to FIG. 2, it is also evident that during an even frame when the even supplemental memory 34 is being updated during writes into the main memory 20, any data in the odd supplemental memory 36 which was updated during the previous computational frame, i.e., an odd frame, as indicated by the contents of the odd update log 42 is transferred into the backup RAM 30. In like fashion, and as illustrated by FIG. 3, during an odd computational frame, while the odd supplemental memory 36 is being updated during writes into the main memory 20, any data in the even supplemental memory 34 which was updated during the previous computational frame, i.e., an even frame, as indicated by the contents of the even update log 40 is transferred into the backup RAM 30. It can be seen, then, that the backup RAM 30 will always contain an identical copy of the main memory 20, but delayed by one computational frame, i.e., one real-time clock frame interval of the CPU.

Figure 4:
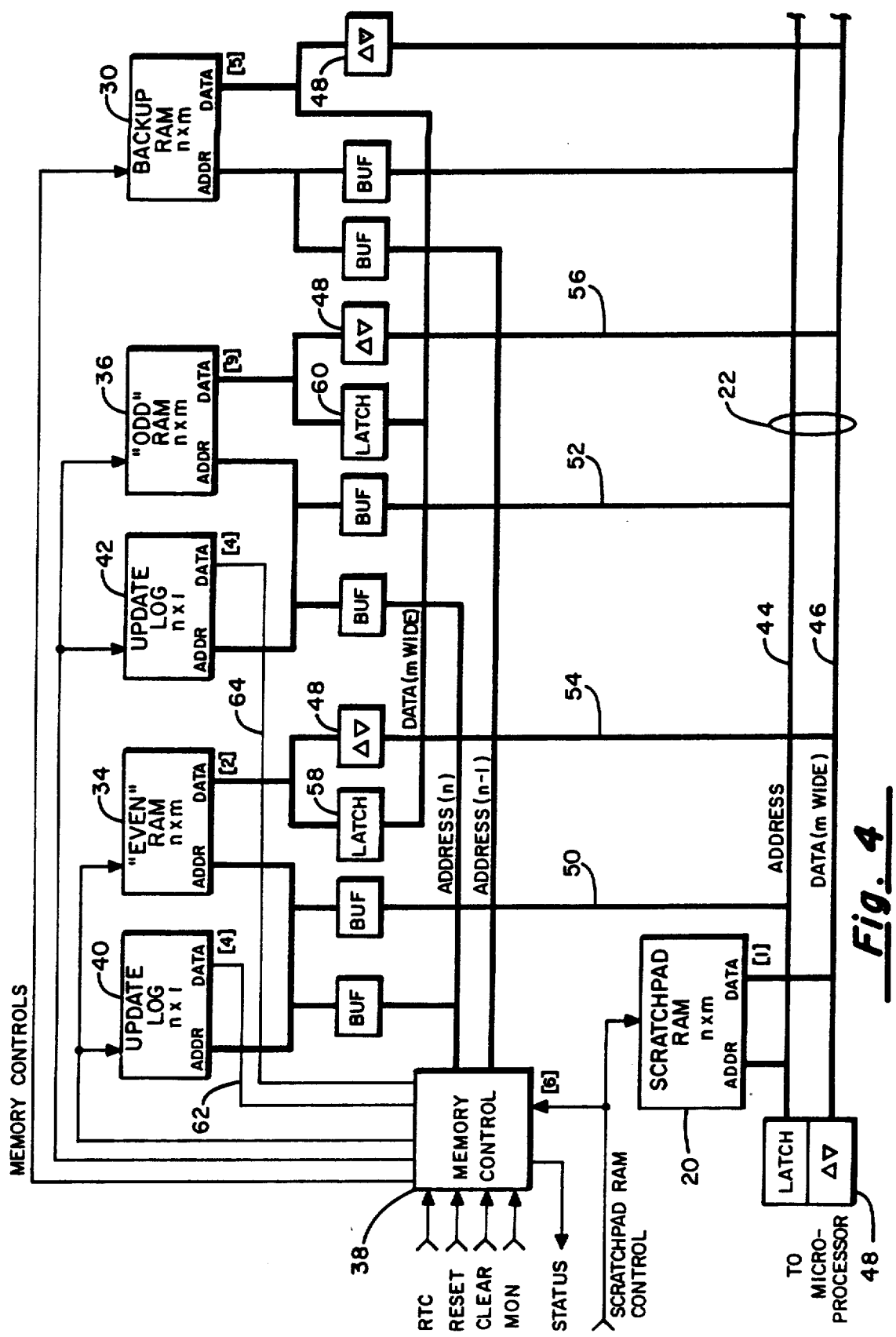
FIG. 4 is a more detailed block diagram of the interconnections between the various memory modules in accordance with a first embodiment of the invention.
Figure 5:
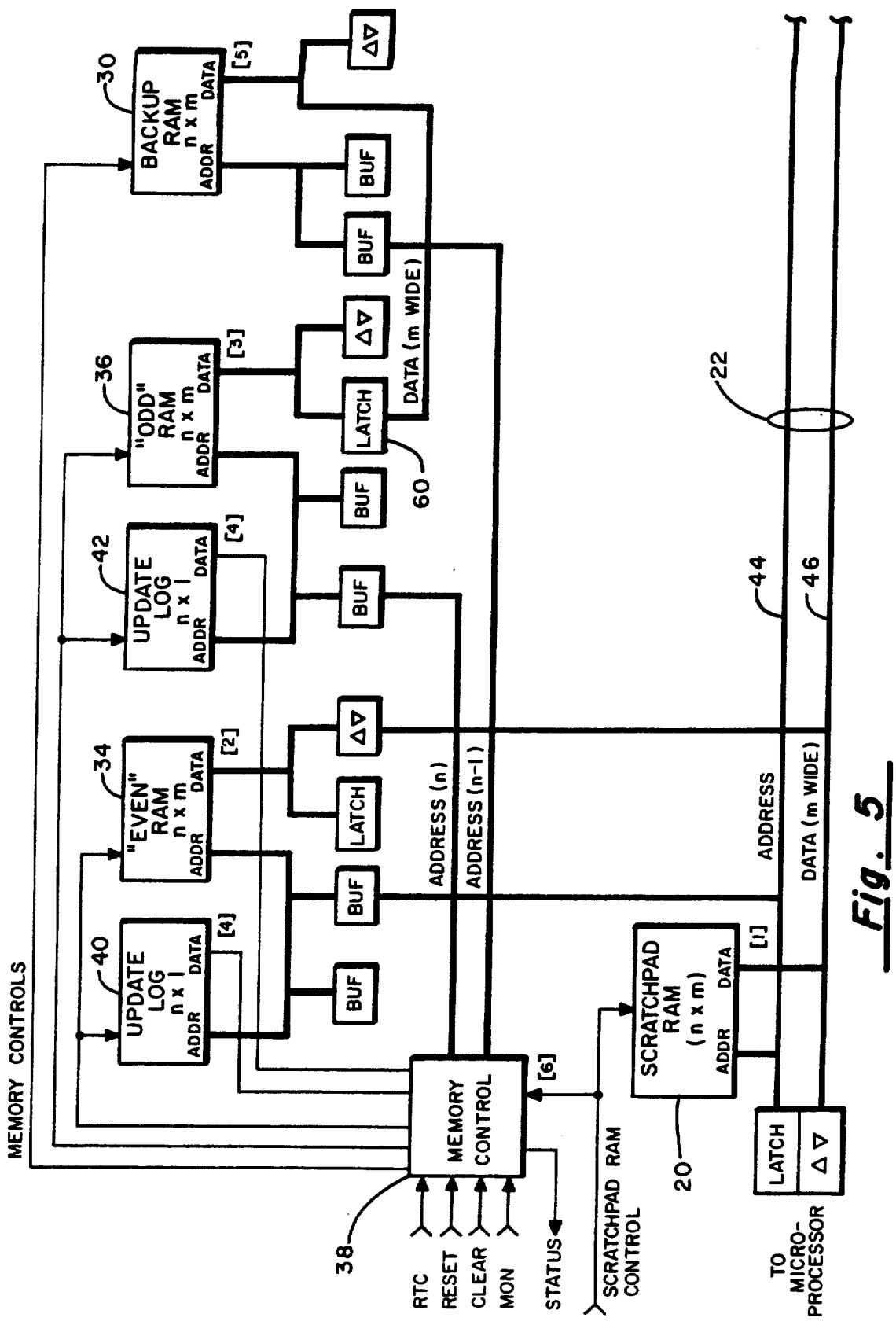
FIG. 5 shows the portions of the block diagram of FIG. 4 active during even computational frames.
Figure 6:
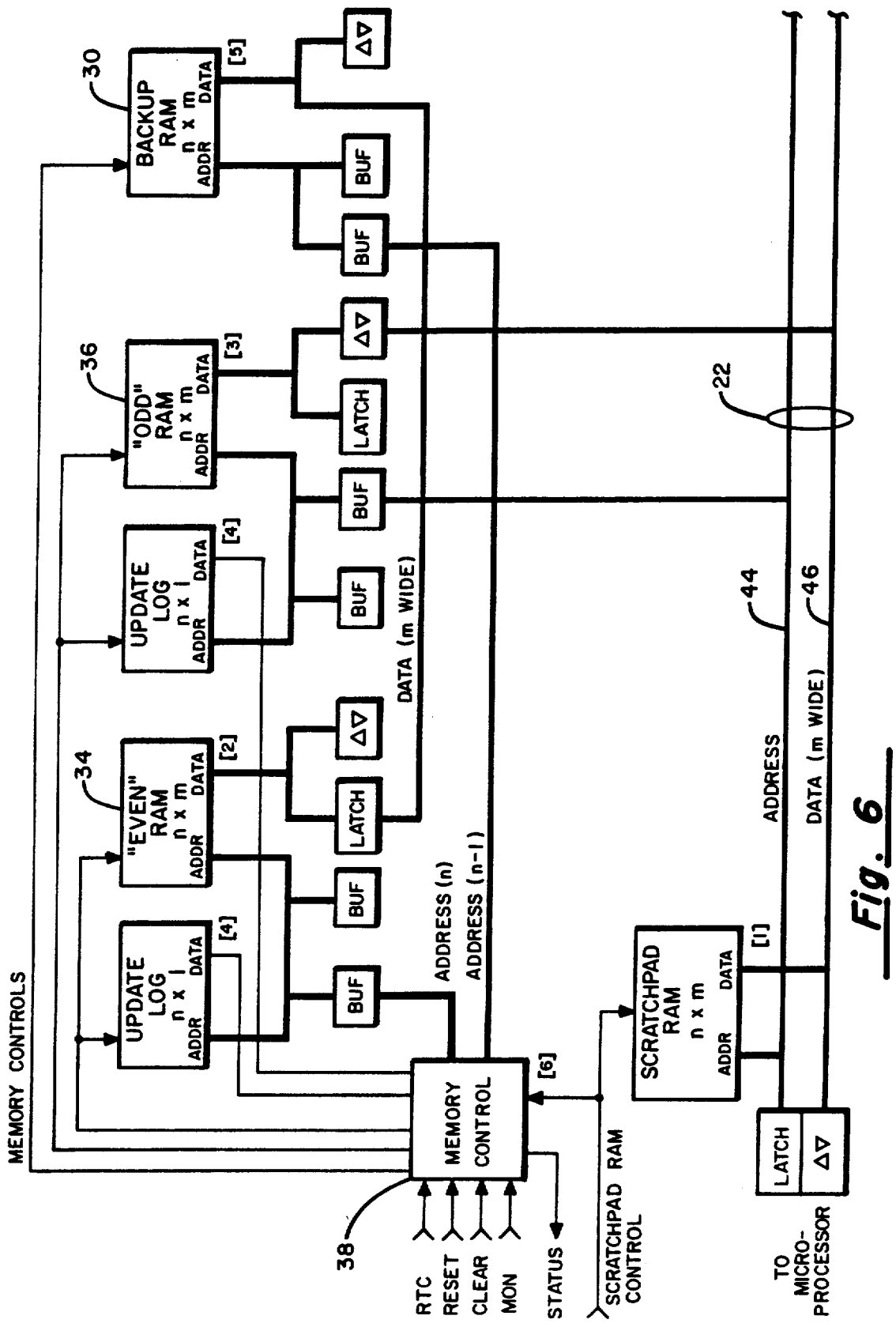
FIG. 6 is a detailed block diagram showing the system configuration during odd computational frames.

While the general block diagrams of FIGS. 1 through 3 are deemed helpful in understanding the underlying principles of the soft error recovery system of the present invention, a better understanding of the overall organization can be obtained from consideration of the more detailed block diagrams of FIGS. 4 through 6. FIG. 4 illustrates the memory and bus configuration when the system is implemented with RAMs. The conventional microprocessor (not shown) has associated with it an address bus 44 and a data bus 46 which is m-bits wide. A main or scratchpad memory 20 receives its address inputs from the address bus 44 and its data inputs from the data bus 46. Also shown connected to the address bus and the data bus is the backup RAM 30 which too is an n-word by m-bit wide memory. The symbol 48 in FIG. 4 is intended to indicate that the bus in question is bidirectional.

So that the even RAM 34 and the odd RAM 36 can eavesdrop on what is being entered into the scratchpad RAM 20, each has its respective address inputs coupled to the address bus via the lines in cables 50 and 52. Similarly, data may be transferred into the supplemental RAMs 34 and 36 over the bidirectional buses 54 and 56.

For controlling data transfers from the even and odd supplemental memories to the backup RAM 30, latches 58 and 60 are included in the data lines joining the output of the supplemental RAMs to the input of the backup RAM.

The memory control 38 is capable of sensing the occurrence of writes into the scratchpad RAM 20 and injects, via lines 62 and 64, a one-bit into the update logs 40 and 42 at the same address as the word being written has on even and odd computational frames. Memory control 38 also provides inputs to the backup RAM, and each of the even and odd supplemental RAMs as well as their associated update logs.

The data recording which takes place during a "even" computational frame is shown in FIG. 5. To facilitate the understanding, the buses which are inactive during the even computational frame are not shown. The memory control 38 monitors all accesses to the main memory 20 and during a write access, the memory control causes an identical write to occur in parallel in the even RAM 34. At this same time, the memory control writes a "1" into the even update log 40 at the same address that the write took place in its associated supplemental RAM. It is to be noted that the update log contains all "0s" at the beginning of each computational frame. In this manner, all words written into the main memory 20 are duplicated in the even supplemental RAM 34 with the associated memory address in the even update log 40 being toggled to a "1", which is a flag bit signifying the presence of updated data in the even supplemental RAM 34 at the corresponding addresses.

During this same "even" computational frame, the main memory data which had been updated in the previous "odd" frame is transferred from the odd supplemental RAM 36 to the backup RAM 30 under control of memory control 38. The transfer operation is automatic and will continue to completion. That is, it will not be suspended by the detection of a processing system disruption.

During the "even" computational frame, as determined by the toggling of the real-time clock, the memory control 38 polls every address of the odd update log 42. While the memory control asserts a given address (n), it reads the odd update log bit and latches the data from the odd supplemental RAM into latch 60. If the odd update log bit is a "1", as perceived by the memory control 38, the data from the latch is written to the backup RAM 30 and the memory control writes a "0" to the odd update log to clear the flag bit at address n. This process continues until all of the addresses in the odd update log have been polled.

FIG. 6 is illustrative of the data recording which takes place during an "odd" computational frame. Again, inactive buses are not shown. The memory control 38 records odd frame data and transfers even frame data as earlier described. Combination of memories 34 and 36 assures that for each computational frame, backup memory 30 is provided with a valid set of update data to bring it to the correct state corresponding to the next computational frame. This is because the transfer to backup memory 30 does not begin until a complete set of error-free data has been accumulated in supplemental RAMs 34 or 36, and once accumulated, the data is protected from upset until the transfer to backup memory 30 is completed.

ALTERNATIVE EMBODIMENT

Where the CPU's real-time clock establishes relatively long frame times, e.g., 100 ms or longer, the system of the present invention may well be implemented using RAM memories throughout. For systems with relatively moderate to short real-time clock computational frame times, e.g., less than 100 ms, it is found expedient to utilize FIFO memories for the even supplemental memory and the odd supplemental memory. The main memory and the backup memory would remain as conventional random access memories each n-words by m-width. The even and odd update logs are implemented by the address FIFOs.

Figure 7:
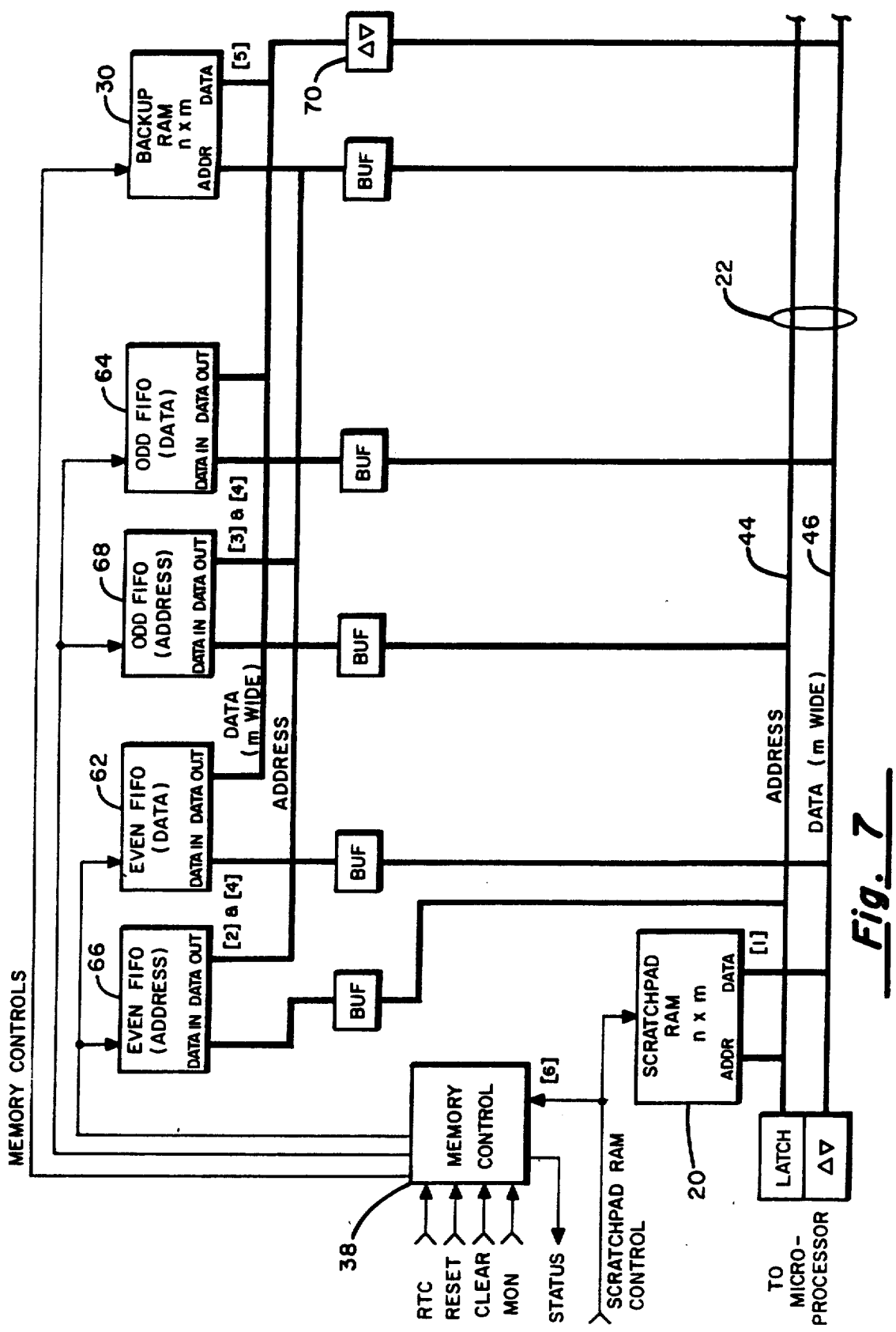
FIG. 7 is a detailed block diagram of the error recovery system comprising an alternative embodiment in which FIFO memories are utilized.

Illustrated in FIG. 7 is the memory and bus configuration of the error recovery system in accordance with the present invention, but using such FIFO memories. Specifically, the even and odd supplemental memories 62 and 64 and the update logs 66 and 68 associated therewith are FIFO memories. Four FIFOs are required: Two for "even" frames and two for "odd" frames. One FIFO is used to store the address and one is used to store the data when an update occurs to the main memory 20.

For a main memory of a size nxm (n-words of m-width), the even and odd data FIFOs 62 and 64 are of width m; the depths of the FIFOs being dependent on the amount of main memory activity expected during a computational frame. The even and odd address FIFOs are the same width as the address bus and are the same depth as the data FIFOs. The backup memory 30 is again a RAM of size nxm.

As with the earlier embodiment, the main memory 20 is tied to the address bus 44 and the data bus 46 as are the even and odd data FIFOs 62 and 64 and the even and odd address FIFOs 66 and 68. The backup RAM 30 also receives address inputs from the bus 44 and data inputs from the bus 46 as indicated by the symbol 70, the data bus coupling the backup RAM to the system bus 46 is bidirectional in nature.

Figure 8:
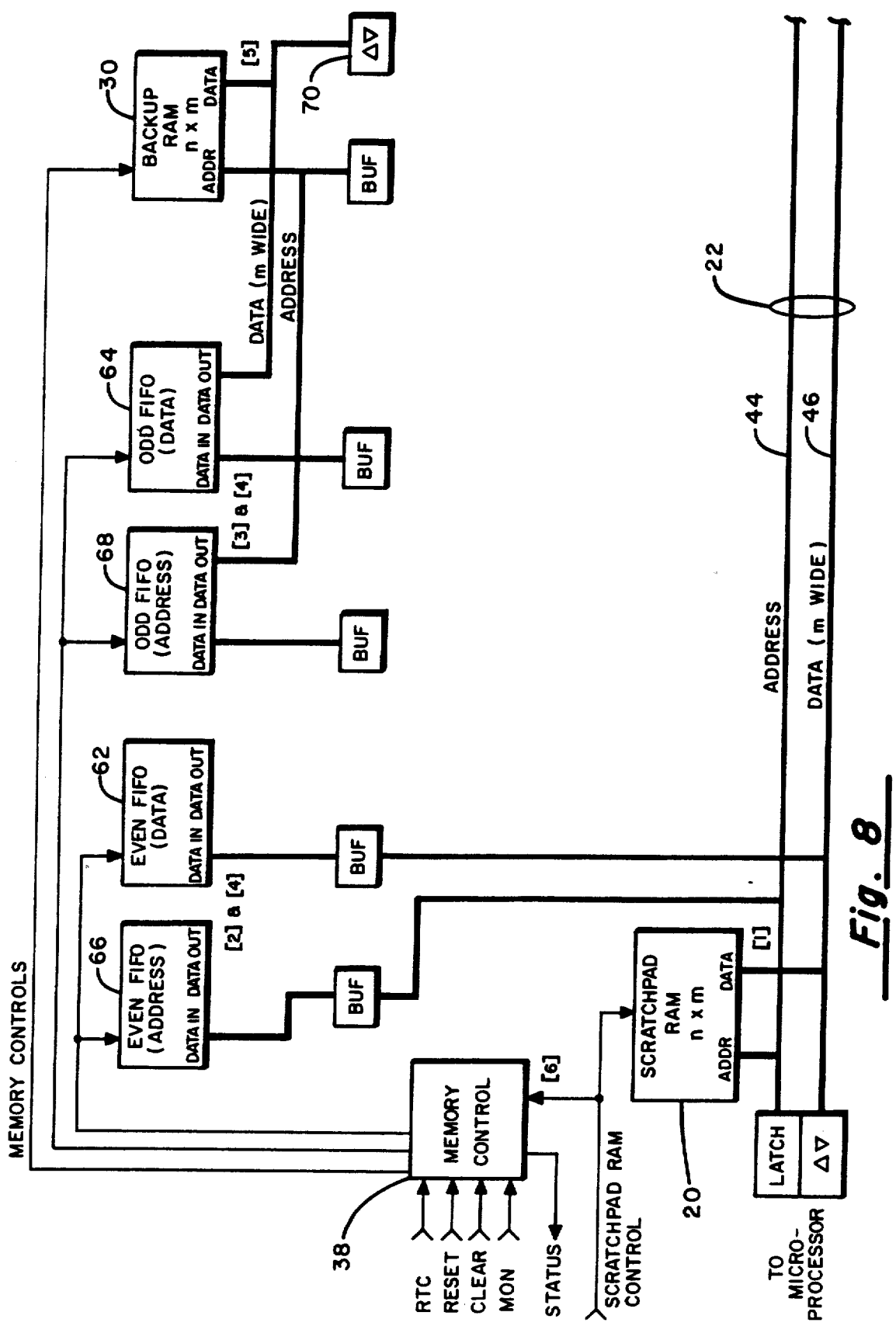
FIG. 8 is a block diagram showing the active portions of the embodiment of FIG. 6 during even computational frames.

The data recording which takes place during an "even" computational frame is shown in the block diagram of FIG. 8. Again, for ease in understanding, inactive buses are purposely omitted. As before, the memory control monitors accesses to the main memory 20. During a write access to the main memory, control 38 causes data and the address resident on the buses to be stored in the even FIFOs 62 and 66, respectively.

During the "even" computational frame, main memory RAM data which had been updated in the previous "odd" frame is transferred from the odd FIFO 64 to the backup RAM 30 under control of the memory control 38. The transfer operation is automatic and will continue to completion, i.e., it will not be suspended by the detection of a processing system disruption.

In much the same fashion, during an "even" computational frame, the memory control 38 performs a succession of read operations on the odd FIFOs. During each read operation, the FIFOs place the address and data of a main memory write access which had occurred during the previous "odd" computational frame. Memory control 38 writes this data to the backup RAM 30, at the given address supplied by FIFO 68. This process continues until the odd FIFOs are empty.

Figure 9:
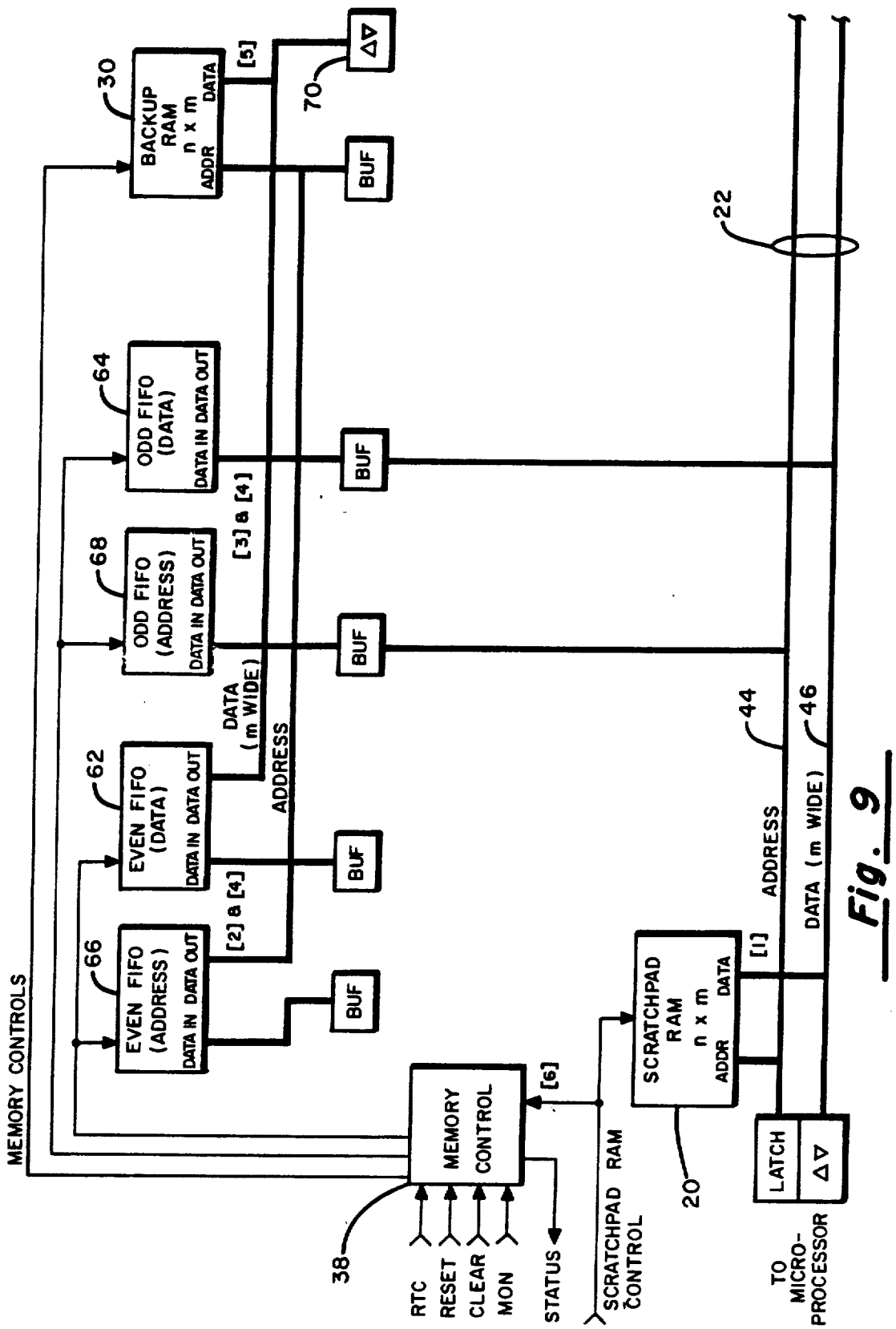
FIG. 9 is a block diagram similar to that of FIG. 8, but during odd computational frames.

The data recording which takes place an "odd" computational frame is shown in FIG. 9. Again, inactive buses are not shown. The memory control 38 here records odd frame data and transfers even frame data as previously described in connection with the discussion of FIG. 7.

Irrespective of which embodiment is employed, when a disturbance to digital computation occurs, it must be detected by the digital system monitors 1 (FIG. 1). The recovery mechanism of the present invention requires that the fault be detected in the same computational frame that it occurs. While the technique of this invention requires immediate detection of any faulty conditions in the digital circuit, it is the manner of recovery, and not the detection mechanism or the EMI protection mechanism that is involved.

The system monitors notify memory control 38 of the occurrence of an upset. The memory control logic then suspends operation of the automatic data recording function. However, the data transfer function to the backup RAM must continue unabated until complete. The bus switches are maintained in their current state. During the disturbance, the main memory and the associated even or odd supplemental memory currently being written into in parallel are assumed to be overwritten by the faulty data. Memory control 38 prevents spurious writes from occurring to the remaining even or odd supplemental memories which is currently downloading data to the backup RAM.

Because the backup RAM 30 is not written to from the external interface, this RAM is robust to EMI conditions. However, it is imperative that the disturbance be detected and the memory control be notified during the same computational frame as the upset occurrence.

Following the disturbance to the digital system, the data in the main memory has been corrupted. However, it is still intact in the backup RAM, one frame delayed. This data may now be transferred to the main memory 20, via a read-only transfer from the backup memory over the address/data bus 22 (FIG. 1). During this time, the backup memory is protected from spurious write operations. If a second disturbance should occur during the data recovery sequence, it can be restarted. Once the main memory state has been restored to its non-faulty contents, the CPU can resume computations based upon these correct variables.

The data restoration function is identical for the two embodiments heretofore described. Following the upset of the system and the restart of the CPU, the software determines that upset had occurred by polling the backup memory status. Following this determination, the software performs a data transfer of the contents of the backup RAM to the main memory. When this transfer is complete, the system software then restarts the control function of the digital system and resumes processing while the data recording function of the recovery mechanism described continues to operate.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. In a digital computing system of the type including a central processing unit having an address/data bus coupled thereto, a main RAM, means coupled to said address/data bus for storing digital words comprising computational frames at addressable locations therein, main memory control means for effecting the writing of digital words comprising said computational frames into said main RAM at or from addresses originating at said central processing unit, apparatus for maintaining the integrity of the words comprising said computational frames stored in said main RAM in spite of system upsets due to external transient noise conditions impacting on said system, comprising:

(a) supplemental memory control means;
   (b) first and second supplemental RAMs;
   (c) first switching means controlled by said supplemental memory control means for alternatively coupling said first and second supplemental RAMs to said address/data bus on successive ones of said computational frames, such that the same digital words comprising a given frame being written in said main RAM are simultaneously copied into one or the other of said first and second supplemental RAMs;
   (d) a backup RAM coupled to said address/data bus;
   (e) second switching means controlled by said supplemental memory control means for coupling said backup RAM to said first and second supplemental RAMs such that during the time words are being copied into said first supplemental RAM, selected words stored in said second supplemental RAM during an immediately preceding computational frame are transferred into said backup RAM and during the time words are being entered into said second supplemental RAM, selected words stored in said first supplemental RAM during the immediately preceding computational frame are transferred into said backup memory means;
   (f) means coupled to said supplemental memory control means for sensing system upsets due to transient noise; and
   (g) means controlled by said supplemental memory control means following the sensing of a system upset for transferring the contents of said backup RAM to said main RAM.

2. The apparatus as in claim 1 wherein said first and second supplemental RAMs, said supplemental memory control means and said backup RAM are isolated from external transient noise.

3. The apparatus as in claim 1 and further including update log means for storing flag bits identifying which words in a computational frame stored in said main RAM have been altered by write operations; and means in said supplemental memory control means for sensing said flag bits whereby only those words stored in said first and second supplemental RAMs are transferred to said backup memory means.

4. The apparatus as in claim 3 wherein said first and second supplemental RAMs, said supplemental memory control means, said backup RAM and said update log means are isolated from said external transient noise.

5. A method for restoring a digital computing system of the type including a central processing unit having a real-time clock, a main RAM memory and an address/data bus coupling said CPU and main RAM together, to an error-free operational state following an external transient disturbance to said CPU, said main RAM or said bus, comprising the steps of:

(a) storing a copy of the digital words comprising even computational frames in a first supplemental RAM as they are being written in said main RAM;
   (b) storing a copy of the digital words comprising odd computational frames in a second supplemental RAM as they are being written into said main RAM, said even and odd computational frames being determined by successive cycles of said realtime clock;
   (c) transferring the contents of said first and second supplemental RAMs to a backup RAM on an alternating basis such that as digital words comprising a current computational frame are being simultaneously written in said main RAM and one of said first and second supplemental RAMs, the preceding computational frame stored in the other of said first and second supplemental RAMs is transferred to said backup RAM;
   (d) monitoring said CPU, said main memory and said address/data bus for occurrences of an external transient noise event; and
   (e) replacing the contents of said main RAM with the contents of said backup RAM following the occurrence of an external transient noise event.

6. The method as in claim 5 and further including the steps of:

(a) providing for each of said first and second supplemental RAMs a flag bit register whose length is equal to the number of words comprising a computational frame;
   (b) storing a flag bit in the bit position of the flag register associated with the first supplemental RAM corresponding to words in even computational frames that are altered by a write operation in said first supplemental RAM;
   (c) storing a flag bit in the bit position of the flag register associated with the second supplemental RAM corresponding to words in odd computational frames that are altered by a write operation in said second supplemental RAM; and
   (d) transferring only those words associated with a flag bit from said first and second supplemental RAMs to said backup RAM during alternating computational frames.

7. A method for allowing a control system incorporating digital computing means having a main memory, a central processing unit, and input/output means intercoupled by an address/data bus to recover from the occurrence of soft errors impacting the system, comprising the steps of:

(a) providing an odd frame memory, an even frame memory, a backup memory and memory control means in an enclosure which effectively shields them from external transient noise, said even frame memory, odd frame memory and backup memory being connectable by switching means to said address/data bus;
   (b) writing words during even computational frames into said even frame memory as they are being written into said main memory;
   (c) writing words during odd computational frames into said odd frame memory as they are being written into said main memory;

(d) maintaining a log of those words in said even and odd frame memories that are updated during the even and odd computational frames, respectively;

(e) during the time that words are being written into said even frame memory or said odd frame memory on a current computational frame, transferring to said backup memory those words in said odd frame memory or even frame memory, respectively, which are identified by said log as having been updated in the immediately preceding computational frame;

(f) sensing the occurrence of external transient disturbances to said central processing unit, said main memory or said address/data bus;

(g) transferring the contents of said backup memory to said main memory at the conclusion of the computational frame in which said disturbance occurred, such that said main memory is returned to the same state as it was during the computational frame preceding the occurrence of said disturbance.

* * * * *